US012801893B2

(12) United States Patent
Okawa et al.

(10) Patent No.: US 12,801,893 B2
(45) Date of Patent: Nov. 17, 2026

(54) PREDICTION APPARATUS, PREDICTION METHOD AND PROGRAM

(71) Applicant: NTT, Inc., Tokyo (JP)

(72) Inventors: Maya Okawa, Tokyo (JP); Hiroyuki Toda, Tokyo (JP)

(73) Assignee: NTT, Inc., Tokyo (JP)

( * ) Notice: Subject to any disclaimer, the term of this patent is extended or adjusted under 35 U.S.C. 154(b) by 493 days.

(21) Appl. No.: 18/558,460

(22) PCT Filed: Jun. 10, 2021

(86) PCT No.: PCT/JP2021/022203
§ 371 (c)(1),
(2) Date: Nov. 1, 2023

(87) PCT Pub. No.: WO2022/259487
PCT Pub. Date: Dec. 15, 2022

(65) Prior Publication Data
US 2024/0220771 A1 Jul. 4, 2024

(51) Int. Cl.
*G06N 3/042* (2023.01)
*G06N 7/01* (2023.01)

(52) U.S. Cl.
CPC ............... *G06N 3/042* (2023.01); *G06N 7/01* (2023.01)

(58) Field of Classification Search
CPC ................................ G06N 3/042; G06N 7/01
See application file for complete search history.

(56) References Cited

U.S. PATENT DOCUMENTS

2013/0159323 A1* 6/2013 Hua .......................... G06F 7/24
707/752

OTHER PUBLICATIONS

Wu, Chuhan, et al. "Fedgnn: Federated graph neural network for privacy-preserving recommendation." arXiv preprint arXiv: 2102.04925 (2021). (Year: 2021).*
Abir De et al., "Learning and Forecasting Opinion Dynamics in Social Networks", 30th Conference on Neural Information Processing Systems (NIPS 2016), Barcelona, Spain.
Yuya Yoshikawa et al, "Information Diffusion Model with Latent Features of Users on Social Networks", Information Processing Society of Japan, Dec. 27, 2013.
Ogata, Yosihiko, "On Lewis' simulation method for point processes", IEEE Transactions on Information Theory, 1981, 27.1: 23-31.

* cited by examiner

*Primary Examiner* — Eric Nilsson
(74) *Attorney, Agent, or Firm* — IPUSA, PLLC

(57) ABSTRACT

Provided is a prediction apparatus, including a parameter estimation unit configured to estimate a parameter of an intensity function indicating a probability of which an opinion expression is performed by each user, based on information dissemination sequence information indicating a history of opinion expressions made by a plurality of users and network information indicating relationships between the plurality of users; and a prediction unit configured to predict an opinion expression of each user based on the estimated parameter.

7 Claims, 5 Drawing Sheets

Fig. 2

101

| USER | OPINION | TIME |
|---|---|---|
| 1 | 1 | 2020/4/1 12:35 |
| 2 | 1 | 2020/4/1 18:07 |
| ... | ... | ... |
| 201 | 0 | 2020/8/30 22:58 |

PREDICTION APPARATUS, PREDICTION METHOD AND PROGRAM

TECHNICAL FIELD

The present invention relates to a prediction apparatus, a prediction method and a program.

BACKGROUND ART

In recent years, communication via social media has become more common with the penetration of smartphones. In these social media, information is spread via social networking consisting of, for example, friends and peers. The information dissemination mechanism can be modeled using a probability model. The most representative mechanism is a Hawkes process. The Hawkes process is a type of point process. The point process is a model for describing the number of occurrences of an event in a minute interval, and the event is information transmission in a social network such as a tweet. An occurrence probability of an event at any time is modeled using a function called an "intensity function." The Hawkes process is a point process that describes bursty information dissemination (a phenomenon in which information is disseminated at an extremely rapid pace in a short period of time).

Social media is widely used as a place where users express their opinions on various topics such as news, political issues, and products. It is known that an opinion of each user may be influenced by their friends in an opinion dissemination process. Each user updates their opinions on each topic by learning from posts of their friends. For example, Non Patent Literature 1 discloses a point process model in which the influence of friends is taken into consideration in the opinion dissemination process. This approach is to describe an intensity function using the linear differential equation, thereby describing the transition of a user's opinion influenced by friends.

CITATION LIST

Non Patent Literature

Non Patent Literature 1: Abir, De, et al., Learning and Forecasting Opinion Dynamics in Social Networks. (2016).

SUMMARY OF INVENTION

Technical Problem

The conventional approach described above is characterized by describing an intensity function of a point process using the linear differential equation, thereby building up an information dissemination model. However, since this approach assumes that interaction between the users has a linearity, it is not possible to implement highly accurate prediction of opinion expressions in consideration of complex interaction.

An object of the disclosed technology is to improve prediction accuracy of opinion expressions.

Solution to Problem

According to the disclosed technology, provided is a prediction apparatus, including a parameter estimation unit configured to estimate a parameter of an intensity function indicating a probability of which an opinion expression is performed by each user, based on information dissemination sequence information indicating a history of opinion expressions made by a plurality of users and network information indicating relationships between the plurality of users; and a prediction unit configured to predict an opinion expression of each user based on the estimated parameter.

Advantageous Effects of Invention

It is possible to improve accuracy of prediction for opinion expressions.

BRIEF DESCRIPTION OF DRAWINGS

FIG. 2 is a diagram illustrating one example of information dissemination sequence information.

DESCRIPTION OF EMBODIMENTS

Hereinafter, an embodiment (present embodiment) of the present invention will be described with reference to the drawings. The embodiment described below is merely an illustrative example, and the embodiment to which the present invention is applied is not limited to the following embodiment.

Outline of Present Embodiment

Similarly to the related art, a prediction device (prediction apparatus) according to the present embodiment describes a temporal change of interaction between users by a differential equation, and describes a temporal evolution of the differential equation by a graph neural network (GNN). Specifically, the prediction device captures the social network as a graph with a user as a vertex and a relationship between users as a side, and obtains a latent vector of a node using the GNN. A temporal change of the latent vector thus obtained is described using a differential equation. By modeling an intensity function of a point process using this differential equation, a dissemination process of information (opinion) is modeled, and transmission of near-future information (opinion) is predicted.

(Exemplified Functional Configuration of Prediction Device)

Figure 1:
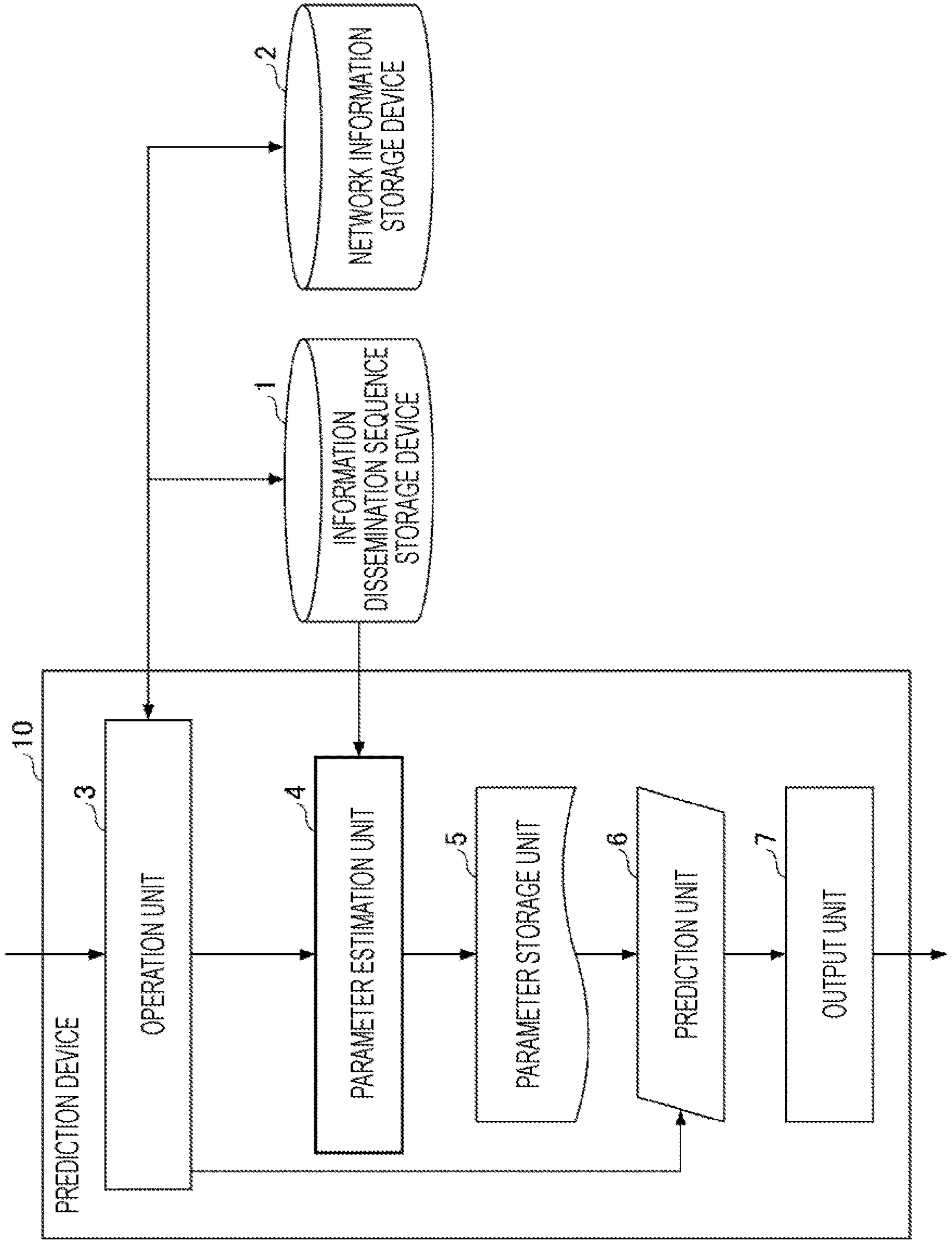
FIG. 1 is a functional configuration diagram of a prediction device.

FIG. 1 is a functional configuration diagram of the prediction device (prediction apparatus). A prediction device 10 (prediction apparatus) includes an operation unit 3, a parameter estimation unit 4, a parameter storage unit 5, a prediction unit 6, and an output unit 7.

The operation unit 3 accepts various operations on data of an information dissemination sequence storage device 1 and a network information storage device 2. The various operations include registration, correction, and deletion of the stored information. An input device of the operation unit 3 is, for example, a keyboard, a mouse, or a touchscreen. The operation unit 3 is implemented by, for example, a device driver of an input device such as a mouse or control software of a menu screen.

The information dissemination sequence storage device 1 stores history information of information dissemination that can be analyzed by the device, reads the information dissemination sequence information according to a request from the device, and transmits the information to the information dissemination prediction device. The information dissemination sequence is, for example, data indicating an occurrence history of crimes, a history of financial transactions, and an occurrence history of demonstrations or strikes, and is represented by a time series. The information dissemination sequence to be analyzed is represented as follows.

$$(u_i, y_i, t_i)\}_{i=1}^{I} \quad \text{[Eq. 1]}$$

Here, $u_i$ denotes a user, $y_i$ denotes an opinion on a specific topic, $t_i$ denotes a time, and I denotes the number of items of data. The number of users is denoted by U. It is assumed that a binary value $y_i \in \{0,1\}$ is given as the opinion on the specific topic. For example, during the US presidential election, a dataset is generated by collecting political tweets and extracting posts including a Republican-related tag as $y_i=0$ and posts including a Democrat-related tag as $y_i=1$. The type of opinion is Y=2 herein. The information dissemination sequence storage device 1 is, for example, a web server that holds web pages, or a database server including a database.

The network information storage device 2 stores network information that can be analyzed by the device, reads the network information according to a request from the device, and transmits the information to the information dissemination prediction device. The network information is an adjacency matrix of a social network consisting of, for example, friends. The social network is represented by a graph G=(V, E) with a user as a vertex and a relationship between users as a side. V is a set of vertices (users) and E is a set of sides. The network information is an adjacency matrix of the graph G, and represented as follows.

$$G \in \mathbb{R}^{U \times U} \quad \text{[Eq. 2]}$$

Here, for example, a binary value representing a friendship (following-follower relationship) on the social media. In a case where there is any relationship (edges) between users (nodes) i and j, an element $G_{i,j}$ in the i-row j-column of a matrix G is set to 1. In a case where there is no relationship (edge) between the users (nodes) i and j, $G_{i,j}$ is set to 0.

The parameter estimation unit 4 learns a parameter of an intensity function representing an occurrence probability of an event on the basis of information stored in the information dissemination sequence storage device 1 and the network information storage device 2. The event is an opinion expression in the social network such as a tweet.

The parameter storage unit 5 stores a set of optimal parameters obtained by the parameter estimation unit 4. The device used for storage may be any device that can store and restore the estimated set of parameters. For example, the set of parameters is stored in a database or a specific area of a general-purpose storage device (memory or hard disk device) provided in advance.

The prediction unit 6 performs simulation of a point process on the basis of the estimation result of the parameter estimation unit 4 and calculates a probability of opinion expressions of each user. There are a plurality of methods for simulating the point process; the prediction unit 6 herein can apply, for example, a method called "thinning" (Reference Literature [1]).

The output unit 7 outputs the result obtained by the prediction unit 6. The concept "output" includes displaying data on a display device, printing by a printer, sound output, and transmission to an external device. The output unit 7 may or may not include an output device such as a display or a speaker. The output unit 7 is implemented by, for example, driver software of the output device.

(Specific Example of Information Dissemination Sequence Information)

FIG. 2 is a diagram illustrating one example of the information dissemination sequence information. Information dissemination sequence information 101 includes "user", "opinion", and "time" as items.

A value of the item "user" is an identifier for identifying each user. A value of the item "opinion" is a binary value indicating a posted opinion. A value of the item "time" is a value indicating a time when the opinion was posted.

(Exemplified Operation of the Prediction Device) Exemplified operation of the prediction device 10 will be described with reference to the drawings. The prediction device 10 initiates the learning processing in response to a user operation or periodically.

Figure 3:
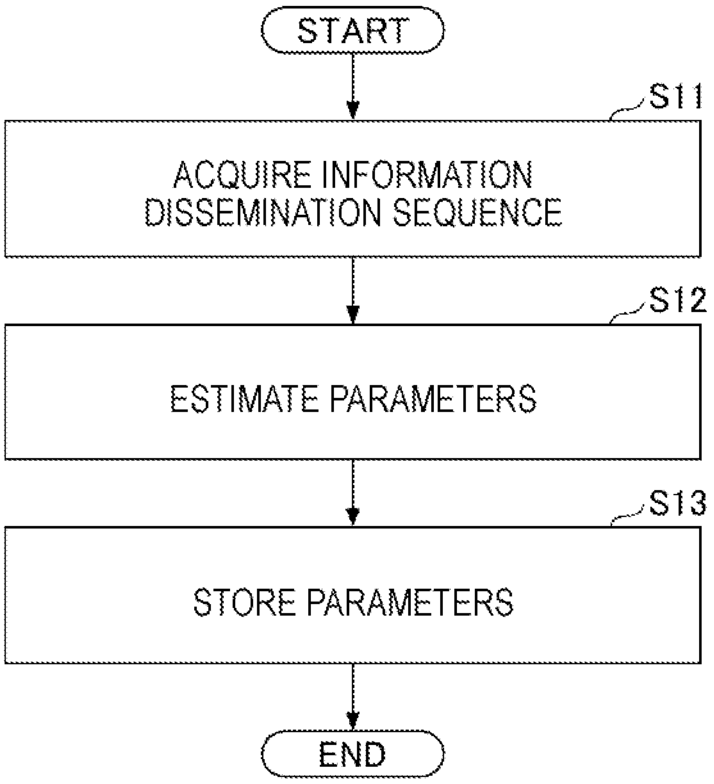
FIG. 3 is a flowchart illustrating one example of a flow of learning processing.

FIG. 3 is a flowchart illustrating one example of a flow of the learning processing. The prediction device 10 acquires an information dissemination sequence (step S11). The parameter estimation unit 4 estimates a parameter (step S12). Specifically, the parameter estimation unit 4 estimates a parameter of an intensity function designed according to procedures a general point process model. The intensity function is a function representing a probability that information is transmitted per unit time. For example, a probability that a user u expresses an opinion y at a time t is represented by Equation (1) using an intensity function $\lambda_u(t,y)$.

[Eq. 3]

$$\lambda_u(t, y) = P_u^*(y \mid t)\lambda_u^*(t) \quad (1)$$

Here, t is a time and y is an opinion. For better understanding, an example in which the intensity function is decomposed into a term $P^*_u(y|t)$ depending on the opinion y and a term $\lambda^*_u(t)$ depending only on the time t has been described. However, the intensity function may be represented by another equation. In addition, $\lambda^*_u(t)$ is modeled using the intensity function of the Hawkes process as shown in Equation (2).

[Eq. 4]

$$\lambda_u^*(t) = \mu_u + \sum_{j:t_j<t} \alpha_{u,u_j} k(t - t_j) \quad (2)$$

Here, $\mu_u$ is referred to as a "background rate" and represents an occurrence probability of an event independent of a past event. The constant $\mu_u$ that does not change over time is used for better understanding, but $\mu_u$ may vary depending on time. $k(\cdot)$ is a trigger function used in the conventional Hawkes process model, and is modeled using, for example, an exponential attenuation function, a Weibull distribution, or a gamma distribution. A different background rate is assumed for each user u. $P^*_u(y|t)$ is a function representing a temporal change of the opinion the user u shows, and is modeled using a differential equation. Specifically, the latent state of the differential equation is represented as follows.

$$X(t) \in \mathbb{R}^{U \times d} \quad \text{[Eq. 5]}$$

A time evolution is described as Equation (3).

[Eq. 6]

$$\frac{dX(t)}{dt} = f(X(t), G, W), X(0) = X_0 \tag{3}$$

Here, d is the number of dimensions of the latent state, and f(·) is a function that describes the temporal evolution of the differential equation. $X_0$ is an initial value of a latent state X(t), and W is a parameter of the GNN.

$$G \in \mathbb{R}^{U \times U} \quad \text{[Eq. 7]}$$

is network information and represents, for example, a friendship between users.

In order to model a complicated opinion transition due to the influence of other users, f(·) is described using the graph neural network (GNN). In a case where the opinion y is represented by a binary value, the probability $P^*_u(y=k)$ that the user u has the opinion y=k at the time t is described as shown in Equation (4) using a softmax function.

[Eq. 8]

$$P^*_u(y = k \mid X(t)) = \text{softmax}\left(X^{(u)}(t) W_k + b_k\right) \tag{4}$$

where $$X^{(u)}(t) \in \mathbb{R}^d \quad \text{[Eq. 9]}$$

is a vector obtained by extracting a component related to the user u from the latent state X(t).

$$W_k \in \mathbb{R}^d, b_k \in \mathbb{R} \quad \text{[Eq. 10]}$$

is a parameter of the softmax function for each opinion k.

When the information dissemination sequence up to a time T is given, the likelihood of this model is represented by Equation (5).

[Eq. 11]

$$\mathcal{L} = \sum_{i=1}^{I}\sum_{u=1}^{U}\left[\log P^*_u(y_{i+1} \mid X(t_i)) + \log \lambda^*_u(t_{i+1}) - \int_{t_i}^{t_{i+1}} \lambda^*_u(\tau) d\tau\right] = \sum_{i=1}^{I}\sum_{u=1}^{U}\left[\log P^*_u(y_{i+1} \mid X(t_i)) + \log\left(\mu_u + \sum_{j:t_j<t_{i+1}} \alpha_{u,u_j} k(t_{i+1} - t_j)\right) - \mu_u(t_{i+1} - t_i) - \alpha_{u,u_{i+1}}(K(t_{i+1} - t_i) - K(0))\right]. \tag{5}$$

K(·) is an integral of the trigger function k(·), and an analytical solution is obtained for several trigger functions k(·) such as an exponential decay function, a Weibull distribution, and a gamma distribution.

The parameter estimation unit 4 estimates the following parameters: a parameter W of f(·) which is GNN that minimizes a likelihood L, an initial value $X_0$ of the latent state X(t), a parameter $\{W_k, b_k\}$ of $P^*_u(\cdot)$, a parameter of the kernel function k(·), and a parameter μ of the intensity function=$\{\mu_1, \ldots, \mu_u\}$.

$$A = (\alpha_{i,j}) \in \mathbb{R}^{U \times U} \quad \text{[Eq. 12]}$$

The parameter estimation unit 4 may use any method for optimizing the parameter. Since the likelihood of Equation (5) can be differentiated for all the parameters, the parameter estimation unit 4 can optimize the likelihood by using a steepest descent method (gradient method) such as error back propagation.

The parameter storage unit 5 stores the estimated parameters (step S13).

Furthermore, the prediction device 10 initiates prediction processing in response to, for example, a user operation.

Figure 4:
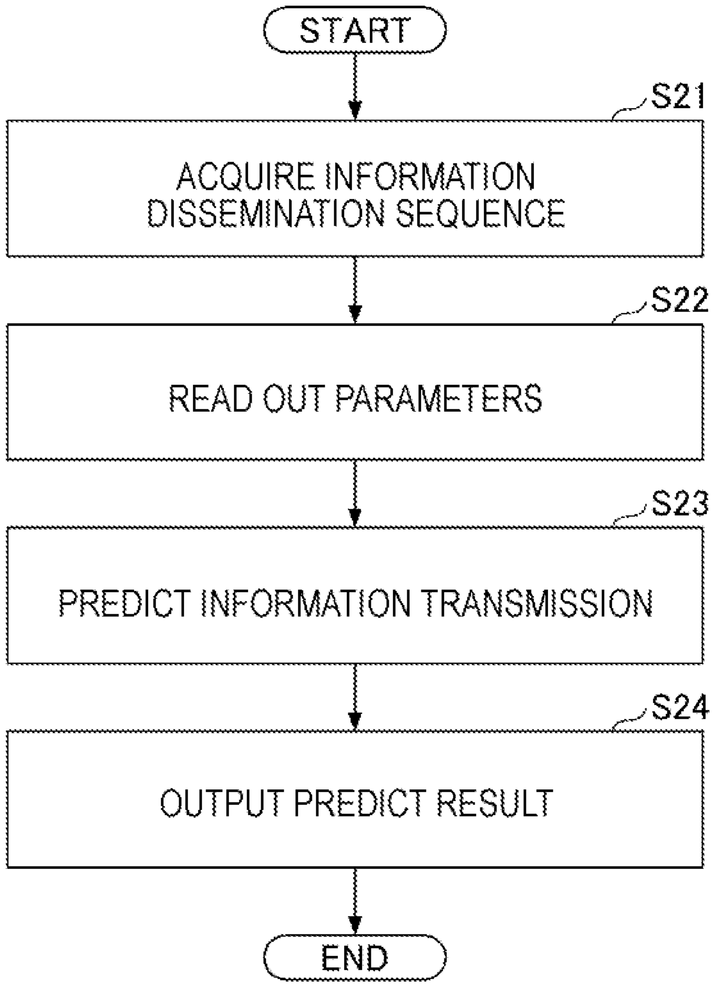
FIG. 4 is a flowchart illustrating one example of a flow of prediction processing.

FIG. 4 is a flowchart illustrating one example of a flow of the prediction processing. The prediction device 10 acquires the information dissemination sequence (step S21). The prediction unit 6 reads the parameters estimated by the learning process (step S22). Subsequently, the prediction unit 6 performs a point process simulation using the read parameters and predicts transmission of information in the near future (step S23). The output unit outputs the prediction result (step S24).

(Hardware Configuration Example According to Present Embodiment)

The prediction device 10 can be implemented, for example, by causing a computer to execute a program describing processing content described in the present embodiment. Note that the "computer" may be a physical machine, or may be a virtual machine in a cloud. In a case where a virtual machine is used, "hardware" described herein is virtual hardware.

The program is recorded in a computer-readable recording medium (such as a portable memory) so that the program can be stored and distributed. In addition, the program can also be provided through a network such as the Internet or an electronic mail.

Figure 5:
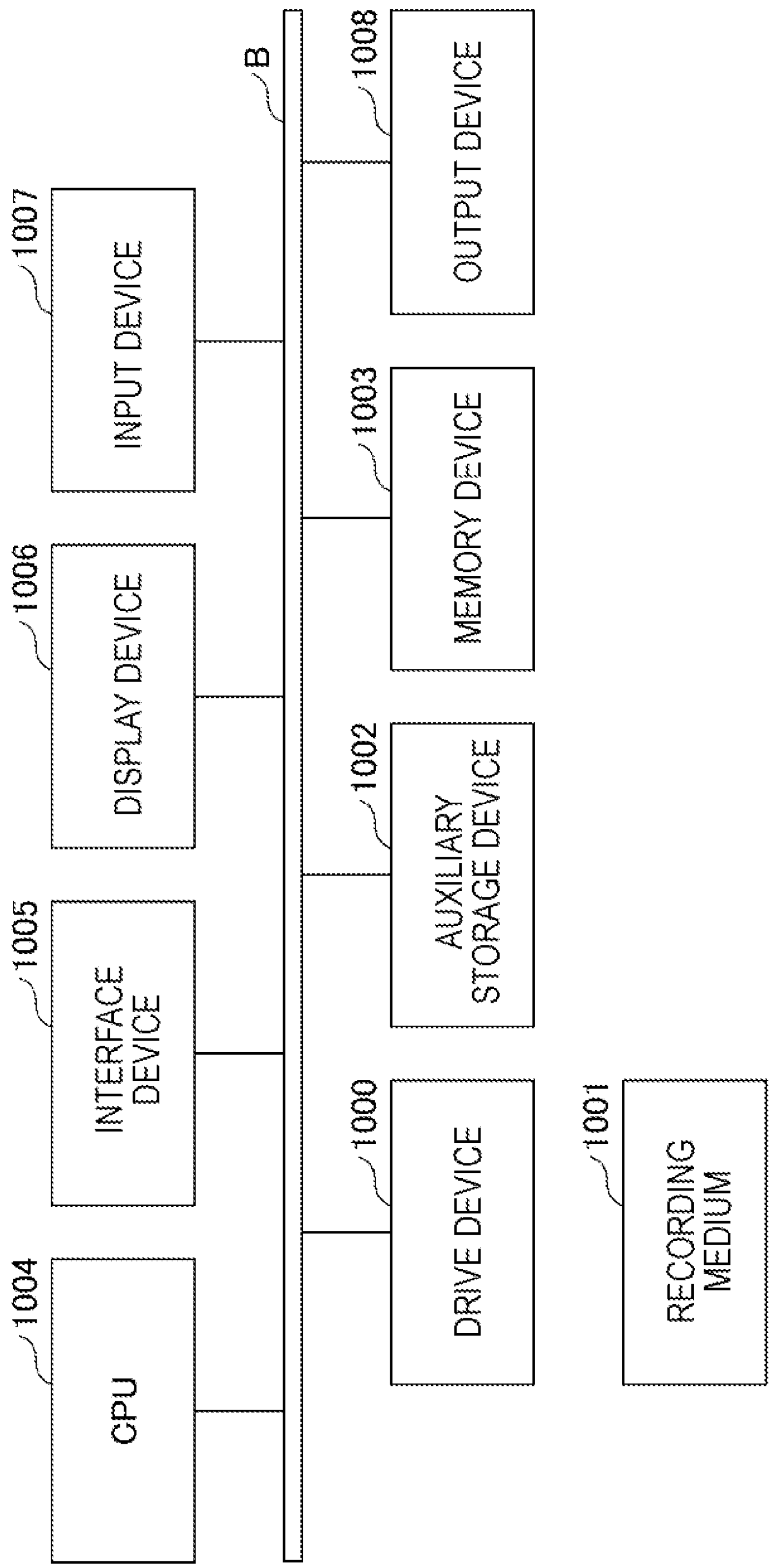
FIG. 5 is a diagram illustrating a hardware configuration example of a computer.

FIG. 5 is a diagram illustrating a hardware configuration example of the computer. The computer in FIG. 5 includes a drive device 1000, an auxiliary storage device 1002, a memory device 1003, a CPU 1004, an interface device 1005, a display device 1006, an input device 1007, and an output device 1008, which are connected to each other by a bus B.

The program for performing processing in the computer is provided through a recording medium 1001 such as a CD-ROM or a memory card, for example. When the recording medium 1001 storing the program is set in the drive device 1000, the program is installed on the auxiliary storage device 1002 from the recording medium 1001 via the drive device 1000. However, the program is not necessarily installed from the recording medium 1001, and may be downloaded from another computer via a network. The auxiliary storage device 1002 stores the installed program, and also stores necessary files and data.

In a case where an instruction to start the program is issued, the memory device 1003 reads and stores the program from the auxiliary storage device 1002. The CPU 1004 achieves the functions related to the device, according to the program stored in the memory device 1003. The interface device 1005 is used as an interface for connecting to a network. The display device 1006 displays a graphical user interface (GUI) or the like by the program. The input device 1007 includes a keyboard and mouse, buttons, a touch panel, or the like, and is used to input various operation instructions. The output device 1008 outputs operation results. Note that the computer may include a graphics processing unit (GPU) or a tensor processing unit (TPU) instead of the CPU 1004, and may include a GPU or a TPU in addition to the CPU 1004. In that case, for example, the processing may be shared and executed such that the GPU or TPU executes processing requiring special operation such as a neural network and the CPU 1004 executes other processing.

Effects of the Present Embodiment

According to the prediction device 10 of the present embodiment, it is possible to learn a complicated influence between users by modeling an opinion transition using GNN. Therefore, it is possible to improve accuracy of prediction for opinion expressions.

REFERENCE LITERATURE

[1]:OGATA, Yosihiko. On Lewis' simulation method for point processes. IEEE Transactions on Information Theory, 1981, 27.1:23-31.

Summary of Embodiment

In the present specification, at least the prediction device (prediction apparatus), the prediction estimation method, and the program described in the following items are described.

(Item 1)

A prediction apparatus, comprising:

a parameter estimation unit configured to estimate a parameter of an intensity function indicating a probability of which an opinion expression is performed by each user, based on information dissemination sequence information indicating a history of opinion expressions made by a plurality of users and network information indicating relationships between the plurality of users; and a prediction unit configured to predict an opinion expression of each user based on the estimated parameter.

(Item 2)

The prediction apparatus as set forth in Item 1, wherein the network information is an adjacency matrix of graph neural networks (GNNs), which represents a temporal evolution of a differential equation representing temporal change in interaction between users.

(Item 3)

The prediction apparatus as set forth in Item 1 or 2, wherein the parameter estimation unit is configured to estimate a parameter that minimizes a likelihood of which the opinion expression is performed by means of gradient method.

(Item 4)

The prediction apparatus as set forth in any one of Items 1 to 3, wherein the prediction unit is configured to calculate a probability of which the opinion expressions by simulation of a point process based on the estimated parameter.

(Item 5)

A prediction method executed by a prediction apparatus, the method comprising steps of:

estimating a parameter of an intensity function indicating a probability of which an opinion expression is performed by each user, based on information dissemination sequence information indicating a history of opinion expressions made by a plurality of users and network information indicating relationships between the plurality of users; and predicting an opinion expression of each user based on the estimated parameter.

(Item 6)

A program for causing a computer to function as each unit in the prediction apparatus as set forth in any one of Items 1 to 4.

Although the present embodiment has been described above, the present invention is not limited to such a particular embodiment, and various modifications and changes can be made within the scope of the gist of the present invention described in accompanying claims.

REFERENCE SIGNS LIST

1 Information dissemination sequence storage device
2 Network information storage unit
3 Operation unit
4 Parameter estimation unit
5 Parameter storage unit
6 Prediction unit
7 Output unit
10 Prediction device
1000 Drive device
1001 Recording medium
1002 Auxiliary storage device
1003 Memory device
1004 CPU
1005 Interface device
1006 Display device
1007 input device
1008 Output device

The invention claimed is:

1. A prediction apparatus, comprising:

a processor; and a memory that includes instructions, which when executed, cause the processor to execute:

estimating a parameter of an intensity function indicating a probability of which an opinion expression is performed by each user, based on information dissemination sequence information indicating a history of opinion expressions made by a plurality of users and network information indicating relationships between the plurality of users;

wherein the network information is an adjacency matrix of graph neural networks (GNNs), which represents a temporal evolution of a differential equation representing temporal change in interaction between users, wherein the intensity function includes a first term depending on an opinion and a second term depending only on a time, wherein the second term is modeled using a background rate representing an occurrence probability of an event independent of a past event and a trigger function of a Hawkes process, wherein the first term represents a temporal change of the opinion of the user and is modeled using the differential equation, wherein the estimating includes estimating a parameter that minimizes a likelihood of which the opinion expression is performed by means of gradient method; and predicting an opinion expression of each user based on the estimated parameter, wherein the predicting includes calculating a probability of the opinion expression by simulation of a point process based on the estimated parameter.

2. The prediction apparatus according to claim 1, wherein the network information is an adjacency matrix of graph neural networks (GNNs), which represents a temporal evolution of a differential equation representing temporal change in interaction between users.

3. The prediction apparatus according to claim 1, wherein the estimating includes estimating a parameter that minimizes a likelihood of which the opinion expression is performed by means of gradient method.

4. The prediction apparatus according to claim 1, wherein the predicting includes calculating a probability of the opinion expression by simulation of a point process based on the estimated parameter.

5. The prediction apparatus according to claim 1, wherein the trigger function of the Hawkes process is modeled using an exponential attenuation function, a Weibull distribution, or a gamma distribution, and wherein the simulation of the point process is executed by applying a thinning method.

6. A prediction method executed by a computer in a prediction apparatus, the method comprising:

estimating a parameter of an intensity function indicating a probability of which an opinion expression is performed by each user, based on information dissemination sequence information indicating a history of opinion expressions made by a plurality of users and network information indicating relationships between the plurality of users;

wherein the network information is an adjacency matrix of graph neural networks (GNNs), which represents a temporal evolution of a differential equation representing temporal change in interaction between users, wherein the intensity function includes a first term depending on an opinion and a second term depending only on a time, wherein the second term is modeled using a background rate representing an occurrence probability of an event independent of a past event and a trigger function of a Hawkes process, wherein the first term represents a temporal change of the opinion of the user and is modeled using the differential equation, wherein the estimating includes estimating a parameter that minimizes a likelihood of which the opinion expression is performed by means of gradient method; and predicting an opinion expression of each user based on the estimated parameter, wherein the predicting includes calculating a probability of the opinion expression by simulation of a point process based on the estimated parameter.

7. A non-transitory computer-readable recording medium having computer-readable instructions stored thereon, which when executed, cause a computer including a memory and a processor to execute the estimating and the predicting of the prediction apparatus according to claim 1.

* * * * *